(12) United States Patent
Linden

(10) Patent No.: US 9,487,201 B2
(45) Date of Patent: Nov. 8, 2016

(54) HYDRAULIC PRESSURE GENERATOR FOR A VEHICLE BRAKE SYSTEM, VEHICLE BRAKE SYSTEM HAVING SUCH A HYDRAULIC PRESSURE GENERATOR, AND METHOD FOR OPERATING THE HYDRAULIC PRESSURE GENERATOR

(75) Inventor: Christoph Linden, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 3 days.

(21) Appl. No.: 13/704,078

(22) PCT Filed: May 23, 2011

(86) PCT No.: PCT/EP2011/002556
§ 371 (c)(1),
(2), (4) Date: Feb. 7, 2013

(87) PCT Pub. No.: WO2011/157347
PCT Pub. Date: Dec. 22, 2011

(65) Prior Publication Data
US 2013/0213025 A1 Aug. 22, 2013

(30) Foreign Application Priority Data
Jun. 15, 2010 (DE) ........................ 10 2010 023 865

(51) Int. Cl.
*B60T 13/74* (2006.01)
*B60T 13/02* (2006.01)
(Continued)

(52) U.S. Cl.
CPC ............ *B60T 13/741* (2013.01); *B60T 8/4018* (2013.01); *B60T 8/4031* (2013.01); *B60T 8/4081* (2013.01); *B60T 8/4827* (2013.01); *F04B 5/02* (2013.01)

(58) Field of Classification Search
CPC .... B60T 7/042; B60T 8/4028; B60T 8/4031; B60T 8/4827; B60T 8/4081; B60T 13/41; B60T 13/741; B60T 13/168; B60T 13/588; B60T 13/686; B60T 13/146; B60T 13/662; B60T 13/745; F04B 5/02
USPC ........... 303/139, 116.4, 11, 119.1, 114.1, 14, 303/116.2, 116.3, 113.5; 188/106 P, 156
See application file for complete search history.

(56) References Cited

U.S. PATENT DOCUMENTS 3,907,377 A * 9/1975 Mayer .................... B60T 8/344
303/113.5
4,381,125 A 4/1983 Wilson
(Continued)

FOREIGN PATENT DOCUMENTS

CN 1374218 A 10/2002
DE 3322422 A1 1/1985
(Continued)

OTHER PUBLICATIONS

English Translation of State Intellectual Property Office of Chine, Search Report, Application No. CN201180030026.5 dated Aug. 13, 2014.

Primary Examiner — Robert A Siconolfi
Assistant Examiner — San Aung
(74) Attorney, Agent, or Firm — MacMillan, Sobanski & Todd, LLC

(57) ABSTRACT

A hydraulic pressure generator for a vehicle brake system comprises a piston and a cylinder that movably accommodates the piston. The piston defines a first hydraulic chamber and a second hydraulic chamber in the cylinder on opposite piston sides, wherein each hydraulic chamber has a hydraulic inlet and a hydraulic outlet. An actuating unit is able to put the piston into a back-and-forth motion so that an intake stroke with regard to the first hydraulic chamber corresponds to a discharge stroke with regard to the second hydraulic chamber, and vice versa.

17 Claims, 1 Drawing Sheet

(51) Int. Cl.
*B60T 8/40* (2006.01)
*B60T 8/48* (2006.01)
*F04B 5/02* (2006.01)

(56) References Cited

U.S. PATENT DOCUMENTS

| | | | |
|---|---|---|---|
| 4,880,282 A * | 11/1989 | Makino | B60T 8/175 |
| | | | 303/10 |
| 5,302,008 A | 4/1994 | Miyake et al. | |
| 5,328,257 A | 7/1994 | Tsukamoto | |
| 5,601,345 A * | 2/1997 | Tackett | B60T 8/4031 |
| | | | 277/500 |
| 5,927,825 A | 7/1999 | Schenk et al. | |
| 6,290,308 B1 | 9/2001 | Zitzelsberger | |
| 6,547,342 B1 | 4/2003 | Schaust et al. | |
| 6,604,795 B2 * | 8/2003 | Isono | B60T 8/4018 |
| | | | 303/11 |
| 6,641,232 B1 * | 11/2003 | Alaze | B60T 8/4031 |
| | | | 303/116.4 |
| 7,780,246 B2 * | 8/2010 | Hatano | B60T 8/00 |
| | | | 303/115.2 |
| 2002/0125767 A1 * | 9/2002 | Lubischer | B60T 8/3275 |
| | | | 303/116.4 |
| 2010/0219678 A1 | 9/2010 | Koeth | |
| 2011/0241419 A1 * | 10/2011 | Ohkubo | B60T 1/10 |
| | | | 303/9.62 |

FOREIGN PATENT DOCUMENTS

| | | | | |
|---|---|---|---|---|
| DE | 3836082 A1 | 4/1990 | | |
| DE | 4041800 A1 | 6/1992 | | |
| DE | 4229041 A1 | 3/1993 | | |
| DE | 19638102 C1 | 8/1997 | | |
| DE | 19905660 A1 | 5/2000 | | |
| DE | 19856917 A1 | 6/2000 | | |
| DE | 19950862 C1 | 11/2000 | | |
| DE | 102004042208 A1 | 1/2007 | | |
| DE | 102006030141 A1 | 1/2008 | | |
| DE | 102007047208 A1 | 4/2009 | | |
| EP | 0034028 A2 | 8/1981 | | |
| EP | 0034029 A2 | 8/1981 | | |
| EP | 0265623 A2 | 5/1988 | | |
| EP | 0305950 A1 | 3/1989 | | |
| EP | 0945614 A2 | 9/1999 | | |
| GB | 2272031 A * | 5/1994 | | B60T 7/122 |
| JP | S4963873 A | 6/1974 | | |
| JP | H04325359 A | 11/1992 | | |
| WO | 9806612 A1 | 2/1998 | | |
| WO | 00/74987 A1 | 12/2000 | | |

* cited by examiner

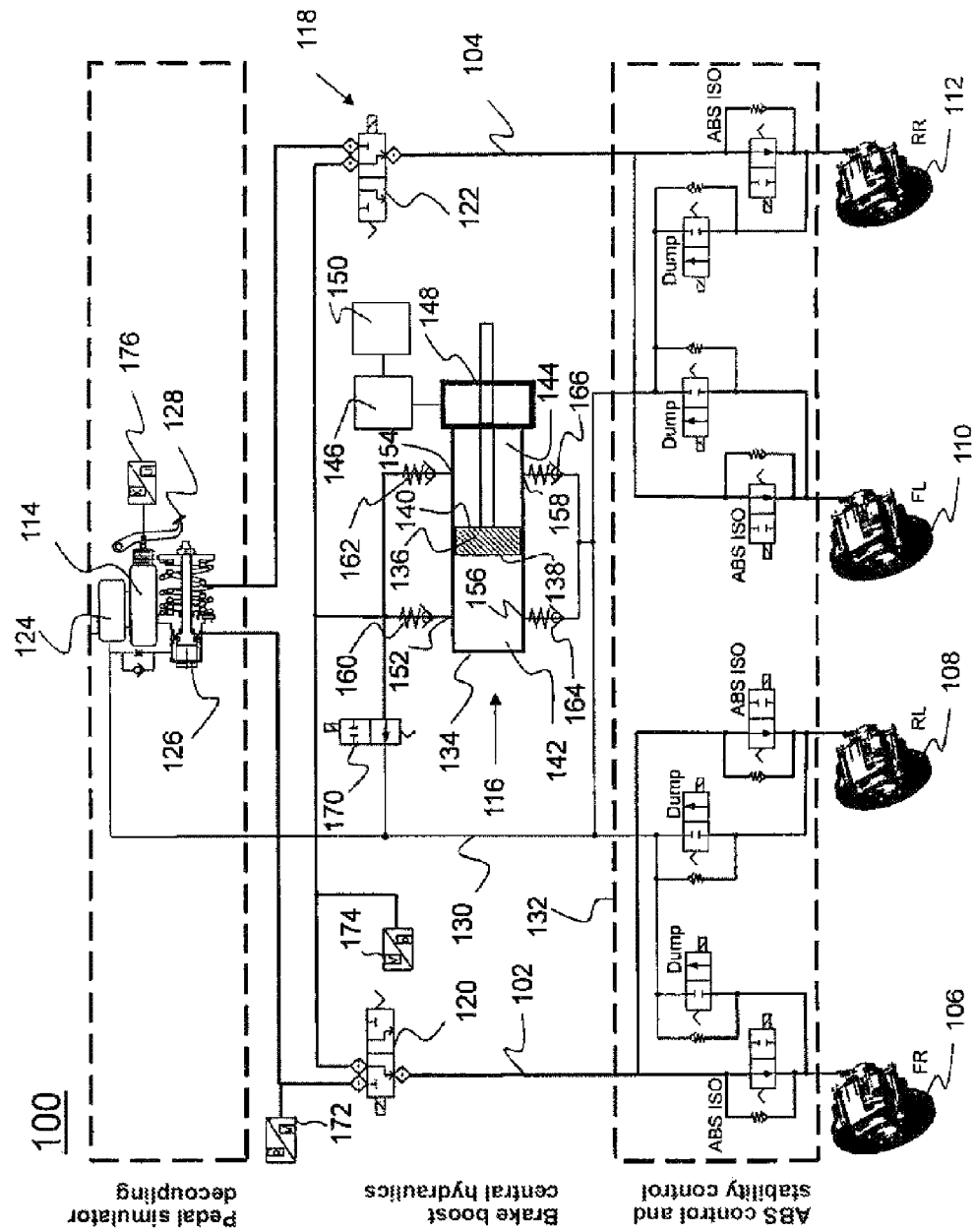

HYDRAULIC PRESSURE GENERATOR FOR A VEHICLE BRAKE SYSTEM, VEHICLE BRAKE SYSTEM HAVING SUCH A HYDRAULIC PRESSURE GENERATOR, AND METHOD FOR OPERATING THE HYDRAULIC PRESSURE GENERATOR

CROSS-REFERENCE TO RELATED APPLICATIONS

This application is a national stage of International Application No. PCT/EP2011/002556 filed May 23, 2011, the disclosures of which are incorporated herein by reference in entirety, and which claimed priority to German Patent Application No. DE 10 2010 023 865.1 filed Jun. 15, 2010, the disclosures of which are incorporated herein by reference in entirety.

BACKGROUND OF THE INVENTION

The present disclosure is directed to a hydraulic pressure generator for a vehicle brake system. The hydraulic pressure generator comprises a cylinder having a piston displaceably accommodated therein, and an actuating unit which is able to put the piston into a back-and-forth motion.

Conventional vehicle brake systems may be actuated either by a driver or else independently of the driver. A braking procedure initiated by the driver is also referred to as service braking. In the context of service braking or independently thereof, a driving safety system may initiate or assist a braking procedure independently of the driver. This is referred to as system braking. The system braking may temporally overlap service braking or take place temporally separately from the service braking. Known driving safety systems comprise, for example, an antilock braking system (ABS), a brake boosting, an electronic stability control (ESC or ESP) and a traction control system (TCS).

In conventional vehicle brake systems, in the case of service braking, the hydraulic pressure is generated in one or more brake circuits by the driver himself. For this purpose, the corresponding brake circuit is hydraulically coupled to a master cylinder which is actuated by the driver by means of a brake pedal in a known manner. In modern vehicle brake systems such as regenerative ("hybrid") or electrohydraulic vehicle brake systems, the hydraulic pressure generation may also take place during service braking by means of a hydraulic pressure generator actuable independently of the driver.

In the case of an electrohydraulic brake system, the master cylinder is fluidically decoupled from each brake circuit during service braking, according to the "brake-by-wire" principle. The hydraulic pressure generation takes place here by means of an electrically operated hydraulic pressure generator which is controlled in dependence on an actuation state of the brake pedal. In the case of a regenerative vehicle brake system, the master cylinder is generally likewise hydraulically decoupled from each brake circuit during service braking. The braking of the vehicle is in this case effected by means of a generator which charges a vehicle battery. If the driver using the brake pedal requires greater vehicle deceleration or, for example, a traction control intervention requires such deceleration, a supplementary hydraulic pressure is generated at the wheel brakes by the hydraulic pressure generator (or a switch-over to a purely hydraulic pressure generation takes place). This procedure is also referred to as "blending".

A two-circuit electrohydraulic brake system is known from DE 10 2007 047 208 A1, and corresponding U.S. patent publication number 2010/219678A1, both of which are incorporated by reference herein in entirety. The brake circuit comprises a hydraulic pressure generator in the form of a two-circuit fluid feed pump. A hydraulic pressure may be generated in each of the two brake circuits by means of the fluid feed pump. Conventional fluid feed pumps are designed as multiple-piston systems. Each piston therein performs intake and discharge strokes in an assigned cylinder. In most cases, a large number of intake and discharge strokes are required per piston, in order to build up the hydraulic pressure necessary in the context of service or system braking.

BRIEF SUMMARY OF THE INVENTION

A hydraulic pressure generator for a vehicle brake system is desired, which permits an improved hydraulic pressure build-up. An operating method for such a hydraulic pressure generator is also to be specified.

In the context of the present disclosure, there is provided a hydraulic pressure generator for a vehicle brake system, which comprises a piston, a cylinder which displaceably accommodates the piston, and an actuating unit for the piston. The piston defines a first hydraulic chamber and a second hydraulic chamber in the cylinder on opposite piston sides, each hydraulic chamber having an inlet for hydraulic fluid ("hydraulic inlet") and an outlet for hydraulic fluid ("hydraulic outlet"). The actuating device is configured to put the piston into a back-and-forth motion so that an intake stroke with regard to the first hydraulic chamber corresponds to a discharge stroke with regard to the second hydraulic chamber (and vice versa).

The hydraulic pressure generator may be used both in a single-circuit and a multiple-circuit vehicle brake system. In a multiple-circuit vehicle brake system, a common hydraulic pressure generator may be provided for a plurality of or all brake circuits. In this case, a (common) hydraulic pressure for the brake circuits may be generated centrally by the hydraulic pressure generator. If required, a pressure adjusting device (e.g. in the form of a valve assembly) may be provided for adjusting, in the individual brake circuits, the central hydraulic pressure generated by the hydraulic pressure generator. It could, however, also be envisaged to provide a separate hydraulic pressure generator per brake circuit for adjusting the hydraulic pressure in the individual brake circuits.

The hydraulic pressure generator may be set up to generate the hydraulic pressure in the context of service braking. Alternatively or additionally to this, the hydraulic pressure generator may also be set up to provide a hydraulic pressure during system braking. The system braking may temporally overlap service braking or take place temporally separately from service braking. System braking is understood here to mean generally a braking intervention by a driving safety system occurring independently of the driver. The driving safety system may realise, inter alia, one or more of the following functions: brake boosting, ABS, ESC/ESP and TCS.

The actuating unit of the hydraulic pressure generator may comprise an electric motor and drive electronics for the electric motor. The drive electronics may be configured to reverse the direction of rotation of the electric motor for the back-and-forth motion of the piston. In this case, the actuating unit may further comprise a transmission arranged between the electric motor and the piston and having, for example, a nut/spindle arrangement, which transmission converts a rotational motion of the electric motor into an axial motion of the piston. Alternative configurations of the actuating unit are, however, likewise conceivable. For instance, the back-and-forth motion of the piston could also be effected by means of an eccentric element driven by the electric motor. This design of the actuating unit requires no reversal of the direction of rotation of the electric motor.

For the hydraulic pressure generator, a non-return valve arrangement having at least two non-return valves may furthermore be provided. A first non-return valve may be arranged in this case in a hydraulic line to a hydraulic fluid reservoir and open on the intake stroke and close on the discharge stroke. A second non-return valve may be arranged in a hydraulic line to at least one wheel brake and close on the intake stroke and open on the discharge stroke.

According to a variant, for the two hydraulic chambers, a common first non-return valve and a common second non-return valve is provided. According to an alternative variant, the non-return valve arrangement comprises for each hydraulic chamber a respective first non-return valve and a respective second non-return valve.

Each hydraulic chamber may have two hydraulic connections, of which one is configured as the hydraulic inlet and the other is configured as the hydraulic outlet. Alternatively to this, at least one of the two hydraulic chambers may have a single hydraulic connection which acts both as the hydraulic inlet and as the hydraulic outlet. The respective flow direction of the hydraulic fluid can in this case be regulated, for example, by means of two non-return valves switched in opposite directions, each connecting at least one of the wheel brakes or a hydraulic fluid reservoir to the (single) hydraulic connection.

Furthermore, at least one shut-off valve may be provided. The shut-off valve may be configured to selectively hydraulically connect to one another (or hydraulically short-circuit) the hydraulic inlet and outlet of at least one of the hydraulic chambers. In this way, for example the position of the piston in the cylinder can be adjusted without build-up of a hydraulic pressure. A further essential function of the shut-off valve may consist in being able to establish a direct connection of the brake circuits to the hydraulic fluid reservoir, in order that hydraulic pressures generated by the hydraulic pressure generator, and present above the at least one second non-return valve in the hydraulic line to the at least one wheel brake, can be reduced again.

Also provided is a vehicle brake system which, besides the hydraulic pressure generator, comprises a master cylinder and a switch-over device. The switch-over device is configured to selectively couple the hydraulic pressure generator or the master cylinder fluidically to a set of wheel brakes. In the case of a two-circuit vehicle brake system, the switch-over valve device may comprise one 3/2-way valve per brake circuit. Furthermore, the vehicle brake system may comprise a traction control system (for example in the form of a control unit). The traction control system may be configured to activate the actuating unit in the context of a traction control intervention.

The vehicle brake system may be an electrohydraulic brake system ("EHB") and/or a regenerative brake system ("hybrid"). In this case, the hydraulic pressure generator may (also) be used in the context of service braking. The vehicle brake system may, however, also be a conventional brake system in which the hydraulic pressure generator is required merely in the context of system braking.

Furthermore, a method for operating the hydraulic pressure generator is specified. In this method, the piston is put into a back-and-forth motion by the actuating unit so that an intake stroke with regard to the first hydraulic chamber corresponds to a discharge stroke with regard to the second hydraulic chamber, and vice versa. The piston in its starting position (i.e. for example prior to or after each service braking or system braking operation) may be arranged in such a manner in the cylinder that the first hydraulic chamber and the second hydraulic chamber have an approximately equal volume. For this purpose, the hydraulic inlet and the hydraulic outlet of at least one of the two hydraulic chambers may be fluidically coupled to one another. Furthermore, it is conceivable for a hydraulic pressure generated by the hydraulic pressure generator, and present above the at least one second non-return valve in the hydraulic line to at least one of the wheel brakes, to be selectively reduced again. The two last-mentioned functions may be realised by means of at least one shut-off valve.

Other advantages of this invention will become apparent to those skilled in the art from the following detailed description of the preferred embodiments, when read in light of the accompanying drawings.

BRIEF DESCRIPTION OF THE DRAWINGS

The sole drawing shows an embodiment of a vehicle brake system.

DETAILED DESCRIPTION OF THE INVENTION

An embodiment of a vehicle brake system and of a hydraulic pressure generator provided therefor is explained below with reference to the drawing. The invention is, however, not limited to the embodiment described here by way of example.

FIG. 1 shows a vehicle brake system 100. The vehicle brake system 100 is, for example, an electrohydraulic vehicle brake system or a regenerative vehicle brake system (or a combination thereof). The invention may, however, also be implemented in conventional vehicle brake systems which do not operate according to the "brake-by-wire" principle.

The vehicle brake system 100 according to FIG. 1 comprises a large number of components which may be configured as one or more independently handleable subassemblies, as required. In this regard, different subassemblies may be installed in regions of the motor vehicle which are spaced apart from one another.

As illustrated in FIG. 1, the vehicle brake system 100 is a two-circuit brake system having two diagonally split brake circuits 102, 104. The first brake circuit 102 is configured to supply a right front-wheel brake 106 and a left rear-wheel brake 108 with hydraulic fluid. The second brake circuit 104 has the same task with regard to a left front-wheel brake 110 and a right rear-wheel brake 112. In a departure from the diagonal split illustrated in the drawing, a front/rear split, in which the front-wheel brakes 106, 110 and the rear-wheel brakes 108, 112 are respectively assigned to a particular brake circuit is also conceivable.

The two brake circuits 102, 104 may be selectively supplied with hydraulic fluid by a master cylinder 114 actuable by the driver or a hydraulic pressure generator 116 actuable by an electric motor. By means of the hydraulic pressure generator 116, it is thus also possible to generate a hydraulic pressure in the two brake circuits 102, 104 independently of the driver.

A switch-over device 118 is provided functionally between the wheel brakes 106, 108, 110, 112 on the one hand and the master cylinder 114 and the hydraulic pressure generator 116 on the other hand. In the embodiment, the switch-over device 118 comprises one electrically actuable 3/2-way valve 120, 122 each per brake circuit 102, 104. In the electrically unactuated state, the valves 120, 122 couple the wheel brakes 106, 108, 110, 112 to the master cylinder 114 according to the "push-through" principle. In this way, in the event of a failure of the vehicle electrics or vehicle electronics, a braking of the vehicle is still ensured via a hydraulic pressure generated in the master cylinder 114 by the driver. In the electrically actuated state according to the drawing, the two valves 120, 122 couple the wheel brakes 106, 108, 110, 112 to the hydraulic pressure generator 116. In this case, by means of the hydraulic pressure generator 116, a hydraulic pressure build-up can take place in the two brake circuits 102, 104 both in the case of service braking initiated by the driver and in the case of system braking.

The master cylinder 114 is supplied with hydraulic fluid via an unpressurised reservoir 124. In the electrically actuated state of the 3/2-way valves 120, 122—i.e. when the master cylinder 114 is decoupled from the wheel brakes 106, 108, 110, 112—the hydraulic fluid withdrawn from the unpressurised reservoir is conveyed from the master cylinder 114 into a pedal reaction simulator 126. When the master cylinder 114 is decoupled from the wheel brakes 106, 108, 110, 112, the simulator 126 provides the driver with the usual reaction behaviour for a brake pedal 128 actuating the master cylinder 114. The master cylinder 114 and the simulator 126 may have, for example, the structure known from DE 199 50 862 C1, DE 196 38 102 C1 or DE 10 2007 047 208 A1.

As can be seen from the drawing, a combined return/intake line 130 leads into the unpressurised reservoir 124. Hydraulic fluid can flow back from the wheel brakes 106, 108, 110, 112 into the reservoir 124 via the line 130. Furthermore, the hydraulic pressure generator 116 can draw in hydraulic fluid via the line 130, in order then to feed it into the brake circuits 102, 104 again for hydraulic pressure generation.

Provided between the switch-over device 118 and the wheel brakes 106, 108, 110, 112 is a valve device 132 for driver-independent performance of braking interventions on the wheel brakes 106, 108, 110, 112 (system braking). The valve device 132 comprises per wheel brake 106, 108, 110, 112 two stop valves, which are designed as (controllable or non-controllable) 2/2-way valves. By means of these valves, pressure build-up, pressure maintaining and pressure reduction phases can be performed in a known manner in the context of system braking operations, i.e. safety-related driver-independent braking interventions. Such braking interventions may comprise, for example, ABS, ESC/ESP and or TCS control interventions. Since such control interventions are known per se, they, and the control units (Electronic Control Units, ECUs) used for them, are not explained here in detail. The pressure generator 116 comprises a cylinder 134, in which a piston 136 is displaceably accommodated. The piston 136 is designed as a so-called "plunger" and defines a first hydraulic chamber 142 and a second hydraulic chamber 144 in the cylinder on opposite piston sides 138, 140.

The pressure generator 116 further comprises an actuating unit having an electric motor 146 and a transmission 148 arranged downstream on the output side of the electric motor 146. Furthermore, drive electronics 150 for the electric motor 146 are provided. The electric motor 146 may be a DC motor, for example a so-called "Brushless Direct Current (BLDC)" motor. The transmission 148 comprises a nut/spindle arrangement which converts a rotational motion, generated by the electric motor 146, into a translational motion for the piston 136. The drive electronics 150 are configured to control the direction of rotation of the electric motor 146. In particular, the drive electronics 150 enable a reversal of the direction of rotation of the electric motor 146 for a back-and-forth motion of the piston 136.

Each of the two hydraulic chambers 142, 144 possesses two hydraulic connections, namely a hydraulic outlet 152, 154 and a hydraulic inlet separated therefrom. The two hydraulic outlets 152, 154 are coupled via a respective non-return valve 160, 162 to the inlet sides of the valves 120, 122 of the switch-over valve device 118. In the switching position illustrated in the drawing, hydraulic fluid can thus be conveyed from each of the two hydraulic chambers 142, 144 to the wheel brakes 106, 108, 110, 112. The hydraulic inlets 156, 158 of the cylinder 134, by contrast, lead via a respective non-return valve 164, 166 into the combined return/intake line 130.

The non-return valves 164, 166 communicating with the hydraulic inlets 156, 158 are switched in such a manner that they open on an intake stroke in the respective hydraulic chamber 142, 144 and close on a discharge stroke. The non-return valves 160, 162 communicating with the hydraulic outlets 152, 154, by contrast, are switched in such a manner that they close on an intake stroke in the respective hydraulic chamber 142, 144 and open on a discharge stroke. Owing to this opposite switching of the non-return valves 160, 162, 164, 166, the fluid flow direction of the hydraulic fluid can be suitably controlled in such a manner that on an intake stroke in one of the two hydraulic chambers 142, 144 no hydraulic fluid is conveyed in the direction of the brake circuits 102, 104, while on a discharge stroke no hydraulic fluid is conveyed into the return/intake line 130.

It should be pointed out that in an alternative configuration of the cylinder 134, only a single hydraulic connection per chamber 142, 144 could be provided. This (single) hydraulic connection per chamber 142, 144 then leads into the two oppositely switched non-return valves 160, 164 for the hydraulic chamber 142 and the two oppositely switched non-return valves 162, 166 for the hydraulic chamber 144.

As can be seen from the drawing, a shut-off valve 170 is arranged between the hydraulic outlets 152, 154 and the hydraulic inlets 156, 158 of the hydraulic chambers 142, 144. For the hydraulic build-up in the brake circuits 102, 104, the shut-off valve 170 is switched into a shutting-off position. In the open position illustrated in the drawing, by contrast, the shut-off valve 170 enables a displacement of the piston 136 without hydraulic pressure build-up. Such a displacement is expedient, for example, prior to, or after completion of, a pressure generating cycle by means of the hydraulic pressure generator 116, in order to move the piston 136 into a desired starting position. According to a variant, the piston 136 in its starting position is arranged in such a manner in the cylinder 134 that the first hydraulic chamber 142 and the second hydraulic chamber 144 have an approximately equal volume.

The main function of the shut-off valve 170, however, consists in being able to establish a direct connection of the brake circuits 102, 104 to the hydraulic fluid reservoir 124, in order that hydraulic pressures generated by the hydraulic pressure generator 116, and present above the second non-return valves 160, 162 in the hydraulic line to at least one of the two wheel brakes 106, 108, 110, 112, can be reduced again. In the drawing, although a single shut-off valve 170 is provided for a central pressure reduction, it is understood that alternatively two such shut-off valves 170 may be used to realise a pressure reduction in the individual brake circuits. This approach may be particularly expedient in the use as a regenerative vehicle brake system when a blending is required only at the wheel brakes of one vehicle axle (especially in the case of a front/rear split of the brake circuits).

In one configuration, the cylinder 134 has a volume roughly in the order of a conventional master brake cylinder. Owing to this comparatively large cylinder volume compared with conventional multiple-piston pumps, the hydraulic pressure required for conventional system braking operations can generally be built up by means of a translational motion of the piston 136 in only one direction. In other words, in many cases no reversal of the direction of rotation of the electric motor 146 in the context of "normal" system braking is required. Such a reversal of the direction of rotation is rather performed only when the piston 136 is to be brought back into its starting position again, according to the drawing, following system braking.

If during service braking operations or long-lasting system braking operations, more hydraulic fluid is required for the pressure build-up than can be conveyed by a translational motion of the piston 136 in only one direction, the electric motor 146 is driven by the drive 150 in such a manner that it performs a back-and-forth motion. During this, advantageously a continuous pressure build-up is possible substantially without dead times. This is advantageous, for example, in the case of traction control interventions, since here large hydraulic fluid volumes have to be conveyed due to the repeated pressure reduction.

The drive electronics 150, which may be implemented for example in a control unit, may, additionally or alternatively to traction control interventions (ABS and/or ESC/ESP), also act in conjunction with other control interventions (e.g. blending in hybrid vehicles). Furthermore, the drive electronics 150 may realise a hydraulic brake boost. For control purposes, the drive electronics 150 may process signals from one or more pressure sensors 172, 174. Furthermore, in the context of service braking, additionally the signal of an optional pedal travel sensor 176 may be taken into account in a known manner.

As emerges from the above description, a number of significant advantages for the embodiment of a vehicle brake system illustrated in the drawing result from the use of a "double-acting" piston with one inlet and outlet each per hydraulic chamber. However, it is immediately evident that the vehicle brake system may also be varied, modified or supplemented without giving up all the advantages of using the hydraulic pressure generator presented here. The invention is therefore defined exclusively by the scope of protection of the following claims.

In accordance with the provisions of the patent statutes, the principle and mode of operation of this invention have been explained and illustrated in its preferred embodiments. However, it may be understood that this invention may be practiced otherwise than as specifically explained and illustrated without departing from its spirit or scope.

The invention claimed is:

1. A hydraulic pressure generator arrangement, comprising a hydraulic pressure generator and a shut-off valve, the hydraulic pressure generator comprising:
   a piston;
   a cylinder which displaceably accommodates the piston, the piston defining a first hydraulic chamber and a second hydraulic chamber in the cylinder on opposite piston sides, and each hydraulic chamber having a hydraulic inlet and a hydraulic outlet; and
   an actuating unit which is able to put the piston into a back-and-forth motion so that an intake stroke with regard to the first hydraulic chamber corresponds to a discharge stroke with regard to the second hydraulic chamber, and vice versa;
   the shut-off valve being arranged as only a single shut-off valve between the hydraulic outlets and the hydraulic inlets of the first and second hydraulic chambers, and being set up to allow movement of the piston by the actuating unit into a starting position without hydraulic pressure build-up, after completion of a pressure generating cycle, the piston being adapted to centrally generate hydraulic pressure for multiple brake circuits.

2. The hydraulic pressure generator arrangement according to claim 1, the actuating unit comprising an electric motor and drive electronics for the electric motor, and the drive electronics being configured to reverse the direction of rotation of the electric motor for a back-and-forth motion of the piston.

3. The hydraulic pressure generator arrangement according to claim 2, the actuating unit further comprising a transmission arranged between the electric motor and the piston, and the transmission having a nut/spindle arrangement which converts a rotational motion of the electric motor into an axial motion of the piston.

4. The hydraulic pressure generator arrangement according to claim 1, further comprising a non-return valve arrangement having at least one first non-return valve and at least one second non-return valve, the first non-return valve being arranged in a hydraulic line to a hydraulic fluid reservoir and opening on the intake stroke and closing on the discharge stroke, and the second non-return valve being arranged in a hydraulic line to at least one wheel brake and closing on the intake stroke and opening on the discharge stroke.

5. The hydraulic pressure generator arrangement according to claim 4, the non-return valve arrangement comprising for each hydraulic chamber a respective first non-return valve and a respective second non-return valve.

6. The hydraulic pressure generator arrangement according to claim 1, each hydraulic chamber having two hydraulic connections, of which one is configured as the hydraulic inlet and the other is configured as the hydraulic outlet.

7. The hydraulic pressure generator arrangement according to claim 1, each hydraulic chamber having a hydraulic connection which is configured both as the hydraulic inlet and as the hydraulic outlet.

8. The hydraulic pressure generator arrangement according to claim 4, the shut-off valve being configured to selectively hydraulically short-circuit the hydraulic inlet and the hydraulic outlet of each hydraulic chamber and/or reduce a hydraulic pressure present above the at least one second non-return valve in the hydraulic line to the at least one wheel brake.

9. A vehicle brake system, comprising:
   a hydraulic pressure generator arrangement according to claim 1;
   a master cylinder;
   a switch-over valve device which is configured to selectively couple the hydraulic pressure generator or the master cylinder fluidically to a set of wheel brakes.

10. The vehicle brake system according to claim 9, two brake circuits being provided and the switch-over valve comprising one 3/2-way valve per brake circuit.

11. The vehicle brake system according to one of claims 9 to 10, further comprising a traction control device which is configured to activate the actuating unit in the context of a traction control intervention.

12. A method for operating a hydraulic pressure generator arrangement comprising a hydraulic pressure generator and a shut-off valve, the hydraulic pressure generator comprising a piston, a cylinder which displaceably accommodates the piston, and an actuating unit, the piston defining a first hydraulic chamber and a second hydraulic chamber in the cylinder on opposite piston sides, and each hydraulic chamber having a hydraulic inlet and a hydraulic outlet, the piston being put into a back-and-forth motion by the actuating unit so that an intake stroke with regard to the first hydraulic chamber corresponds to a discharge stroke with regard to the second hydraulic chamber, and vice versa, and through the shut-off valve, arranged as only a single shut-off valve between the hydraulic outlets and the hydraulic inlets of the first and second hydraulic chambers, is opened to allow movement of the piston by the actuating unit into a starting position without hydraulic pressure build-up, after completion of a pressure generating cycle, the piston being adapted to centrally generate hydraulic pressure for multiple brake circuits.

13. The method according to claim 12, the piston in a starting position being arranged in such a manner in the cylinder that the first hydraulic chamber and the second hydraulic chamber have an approximately equal volume.

14. The method according to one of claims 12 to 13, further comprising the step of reducing a hydraulic pressure generated by the hydraulic pressure generator and present above at least one non-return valve, which is arranged in a hydraulic line between the hydraulic pressure generator and at least one wheel brake and closes on the intake stroke and opens on the discharge stroke.

15. The hydraulic pressure generator arrangement according to claim 1 wherein the piston is moved into the desired starting position without hydraulic pressure build-up or reduction in either the first or second hydraulic chamber.

16. The method of claim 12 wherein the pressure generating arrangement further comprises a braking intervention valve device having an isolation valve and a dump valve.

17. The hydraulic pressure generator arrangement according to claim 1 further comprising a braking intervention valve device having an isolation valve and a dump valve for each wheel brake.

* * * * *